United States Patent [19]

Davis et al.

[11] Patent Number: 5,576,700
[45] Date of Patent: Nov. 19, 1996

[54] APPARATUS AND METHOD FOR CONTROLLING AN ELECTRICAL LOAD AND MONITORING CONTROL OPERATIONS AND THE ELECTRICAL LOAD

[75] Inventors: Glenn A. Davis, Lilburn; James M. Massara, Dunwoody, both of Ga.

[73] Assignee: Scientific-Atlanta, Atlanta, Ga.

[21] Appl. No.: 935,837

[22] Filed: Aug. 26, 1992

[51] Int. Cl.$^6$ .................................................. H04Q 1/00
[52] U.S. Cl. ............................... 340/825.16; 340/870.16; 340/870.02; 364/493
[58] Field of Search ................................. 364/184, 283, 364/292, 431.01, 464.04, 493; 340/825.16, 870.02, 870.05, 870.07, 870.08, 310 A, 310 R, 310 CP, 870.16, 825.06; 307/38

[56] References Cited

U.S. PATENT DOCUMENTS

| | | |
|---|---|---|
| 4,086,434 | 4/1978 | Bocchi . |
| 4,190,800 | 2/1980 | Kelly, Jr. et al. . |
| 4,419,665 | 12/1983 | Gurr et al. .......................... 340/825.06 |
| 4,749,992 | 6/1988 | Fitzemeyer et al. . |
| 4,780,910 | 10/1988 | Huddleston et al. . |
| 4,855,922 | 8/1989 | Huddleston et al. . |
| 4,977,515 | 12/1990 | Rudden et al. .......................... 364/492 |
| 5,107,440 | 4/1992 | Callahan et al. ..................... 340/870.02 |

OTHER PUBLICATIONS

A promotional brochure entitled "Digital Control Unit Series DCU-1170," which is distributed by Scientific Atlanta. The copyright date for the promotional brochure is Dec. 1992.
A promotional brochure entitled "Digital Control Unit Series DCU-G1530A," which is distributed by Scientific Atlanta. The copyright date for the promotional brochure is Dec. 1991.
A promotional brochure entitled "Digital Control Unit Series DCU-S2000A," which is distributed by Scientific Atlanta. The date of the brochure is not known, but it is believed to be more than one year before the filing date of the present application.

A promotional brochure entitled "Series DCU-M1180A Digital Control Unit (Motorola Compatible Format)," which is distributed by Scientific Atlanta. The date of the brochure is not known, but it is believed to be more than one year before the filing date of the present application.

A promotional brochure entitled "Capacitor Controller Series DCU-XADN-2," which is distributed by Scientific Atlanta. The promotional brochure has a copyright date of Dec. 1991.

A promotional brochure entitled "Load Management Controller Model LMC-1041+," which is distributed by Scientific Atlanta. The date of the brochure is not known, but it is believed to be more than one year before the filing date of the present application.

A promotional brochure entitled "Universal Network Monitor," which is distributed by Scientific Atlanta. The promotional brochure has a copyright date of Dec. 1991.

Primary Examiner—Brian Zimmerman
Attorney, Agent, or Firm—Jones & Askew

[57] ABSTRACT

A method and apparatus for controlling an electrical load in an electrical load management system and monitoring the load control operations and the energy supplied to the electrical load. The apparatus includes a controller for controlling an electrical load in an electrical distribution network in response to command signals transmitted by a command center remotely located from the electrical load. A first monitor generates electrical load data in response to detecting the distribution or interruption of energy to the electrical load. Furthermore, a second monitor generates electrical load reduction data in response to detecting the control operation of the controller. The apparatus also includes a communicator means for transmitting the electrical load data and the electrical load control data to a data processing center remotely located from the electrical load. The data processing center processes the electrical load data and the electrical load control data to determine the effectiveness of the electrical load management system.

65 Claims, 5 Drawing Sheets

APPARATUS AND METHOD FOR CONTROLLING AN ELECTRICAL LOAD AND MONITORING CONTROL OPERATIONS AND THE ELECTRICAL LOAD

TECHNICAL FIELD

The present invention relates generally to electrical utility load management systems, and more particularly relates to an improved electrical load management device for controlling an electrical load in an electrical load management system and monitoring load control operations and energy supplied to the electrical load.

BACKGROUND OF THE INVENTION

Electrical load management systems for allowing an electrical utility to control the load on the electrical system are known in the art. These systems operate to divert energy requirements to minimize electrical black-outs or "brown-outs". For example, U.S. Pat. No. 4,190,800 to Kelly, Jr. et at., entitled "Electrical Load Management System", assigned to the same assignee as the present invention, describes an electrical load management system wherein a utility command center monitors the use of electrical power and, when peak demand periods occur, transmits coded information by radio from the command center to remote receivers mounted proximate the electrical loads. In this patent, the transmitted signal includes address and command information that is decoded at the receivers. Receivers addressed by the command center pass command information over the distribution lines to the electrical loads, and thereby control the operation of the customers' power consuming devices.

Other load management systems utilize separate radio receivers at each customer's location, rather than providing a receiver at the distribution transformer as in the aforementioned patent. Examples of this type system include the types DCU-1120, -1170, -1180, -1190, and S2000A utility radio switches, otherwise described as digital control units or load control switches, manufactured by Scientific Atlanta, Inc., Atlanta, Ga., and the type REMS-100 radio switch manufactured by General Electric, King of Prussia, Pa. These utility radio switches incorporate an FM receiver that can receive a transmitted signal up to about 25 miles from a transmitter site located at a command center. The transmitter issues commands to temporarily remove power from a selected load. This self-contained receiver is typically mounted on or immediately adjacent to the electrical loads under control, and receives its power from the line that feeds the controlled loads. Switches, jumpers, or other means contained within the receiver configure the receiver to respond only to a particular address or set of addresses, so that different geographical areas, types of appliances, or numbers of consumers may be separately controlled.

A utility develops a wide range of electrical load management strategies for effectively utilizing the remotely controllable radio switches in response to various control scenarios. Typical load control scenarios depend upon a range of parameters, including temperature, humidity, utility customer's tolerance to temperature, and load management system technical performance. For example, a typical load management strategy is the maintenance of the operating duty cycle of selected electrical loads, such as air conditioning units, at a maximum rate of 50% for a control scenario involving a peak power consumption period during a summer afternoon with a 90 degrees average air temperature and a 50 percent humidity factor.

The most effective use of an electrical load management system is based upon applying the proper electrical load management strategy to an identified control scenario. However, the development of an effective electrical load management strategy during each likely control scenario requires the utility to monitor the operation of the electrical load management system during the control scenarios and thereby validate the effectiveness of the developed strategies.

A utility presently determines the effectiveness of an electrical load management system for a selected control scenario by collecting or monitoring energy consumption data for selected customers during predetermined data collection periods involving load management activities. Specifically, the utility compares the maximum energy consumed by the selected customers for each of these collection periods to the maximum energy that would be consumed by these customers in the absence of any load management activities by the electrical load management system.

The utility typically utilizes a load profile recorder located proximate to each customer's electrical load for recording power consumption by each utility customer during predetermined time intervals. The load profile recorder is connected to an electrical load via an energy consumption meter for recording energy consumption by an individual consumer during an extended period of time, typically at least a 30 day data collection period, thereby enabling the utility to determine energy usage patterns for the predetermined time intervals over the course of the collection period.

Upon the conclusion of the collection period, the recorded energy consumption data is forwarded from each load profile recorder to a central data processing site for data translation and evaluation. For certain types of load profile recorders, the utility sends personnel to each load profile recorder site to retrieve the recorded energy consumption data, which is typically recorded on magnetic tape or removable digital memory modules. Other load profile recorders include a telephone interface for sending the recorded energy consumption data via a telephone system to a data processing site either during a prescribed time or in response to an instruction transmitted by the data processing site. The utility then produces a report concerning the energy consumption data for the collection period and utilizes this report to evaluate the effectiveness and cost benefit of the electrical load management program.

Although utilizing a load profile recorder to store energy consumption data is useful for the evaluation of an electrical load management system, the utility necessarily assumes that each load control switch is properly operating in response to the utility's commands during the energy consumption data collection period because the load profile recorder only records energy consumption data and does not monitor or record the actual operation of the load control switch. Nevertheless, a random distribution of load control switches for any data collection period either will be inoperative or will not implement the utility's command for a load reduction because the load does not exceed the power consumption or duty cycle threshold set by the command to initiate the removal of the load. Furthermore, many types of load control switches utilize a load control delay function that prevents a group of these switches from instantaneously responding to a command to implement a load control operation. Instead, these load control switches remove an electrical load from the electrical distribution network only after a variable period of delay time lapses, thereby insuring that the energy supplied by the network is not instantaneously reduced in response to the command.

Consequently, a utility cannot accurately determine the effectiveness of an energy load management system utilizing load control switches merely by assuming that the power consumption data recorded by a load profile recorder during a collection period reflects the actual load reduction implemented by the utility's command for that particular time period. Therefore, a system is needed for monitoring and recording the control operations of individual load control switches, in combination with a monitoring system for recording the power consumption by the controlled load, to enable a utility to accurately determine the effectiveness of its electrical load management system. It would be highly advantageous to implement the system by combining the monitoring and recording functions with the known load control switching function to minimize manufacturing, installation, and maintenance costs.

Furthermore, utilities need a system for controlling a load and monitoring both control operations and power consumption, which further includes a two-way communications system for transmitting load control operation data and energy consumption data to a data processing center to insure a timely delivery of such data for rapid evaluation by the utility. In this manner, a utility may implement a selected control scenario for its electrical load management system during a first day, receive and begin evaluation of the collected data upon the conclusion of the first day, and revise the control scenario for implementation during the next day in response to the evaluation of the data collected during the first day. Consequently, this type of system insures that utility personnel can make timely decisions concerning the control of an electrical distribution network based upon more accurate electrical load management system performance information.

SUMMARY OF THE INVENTION

The present invention overcomes these and other problems in prior art load profile recorders by providing an apparatus and method for controlling and monitoring electrical load reductions and monitoring energy supplied to the electrical load under control.

Briefly described, an electrical load management system includes a plurality of energy control apparatus, each located proximate to a selected electrical load to be controlled, for causing electrical load reductions in an electrical distribution network and monitoring the electrical load control operations and the distribution or interruption of energy supplied to the electrical load. The load control switching and monitoring apparatus includes a control unit, also described as a control means, for controlling the electrical load in response to command signals transmitted by a command center remotely located from the electrical load. Accordingly, the distribution of electrical energy to the electrical load is temporarily interrupted by the control unit in response to a command signal to disconnect the electrical load from the electrical distribution network.

The apparatus further includes a first monitor, otherwise described as a first monitoring means, for generating electrical load data and a second monitor, also referred to as a second monitoring means, for generating electrical load control data. The first monitor generates the electrical load data in response to the distribution or interruption of energy to the electrical load. The second monitor generates the electrical load control data in response to the control operations of the control means to either remove the electrical load from the electrical distribution network or to insert the electrical load into the network. The apparatus also includes a data collection system, also described as a data collection means, for collecting the electrical load data and the electrical load control data, and transmitting the data to a data processing center remotely located from the electrical load.

In this manner, the load control switching and monitoring apparatus operates as a conventional load control switch by removing or inserting the electrical load in response to a command signal and, furthermore, operates as a monitoring system by detecting the distribution or interruption of energy supplied to the individual load under control. Consequently, the utility's use of such an apparatus enables the utility to accurately monitor its electrical load management system and thereby determine the effectiveness of the system for a variety of control scenarios. Furthermore, the utility can use the apparatus to conduct reliability studies of the electrical load management system, including an examination of command center transmitter coverage, load control switch failure rates, and customer or service personnel tampering of the apparatus.

Still more particularly described, the control unit includes a load control receiver for decoding coded command signals transmitted by the utility's command center. The load control receiver outputs decoded command signals only for a selected set of the coded command signals having a predetermined address data associated with the load control receiver. In this manner, the utility can selectively manage the electrical network by addressing only those control units necessary for the implementation of the particular load management strategy. The control unit further includes a control relay circuit, typically an electrical switch, a triac, or an electromechanical relay, which removes the selected electrical load from the electrical distribution network in response to a selected decoded command signal and inserts the selected electrical load upon receiving another decoded command signal.

The first monitor includes a current sensor circuit that generates a current supply signal in response to sensing when the electrical distribution network supplies current to the selected electrical load and a current interruption signal in response to sensing the interruption of current supplied to the electrical load. In response to the current supply signal, a first signal generator outputs a first signal having a first period to the data collection system. The first signal generator also outputs a second signal having a second period to the data collection system in response to the current interruption signal.

The second monitor includes a relay position sensor circuit for generating a load removal signal in response to the control relay circuit operating to remove the selected electrical load from the electrical distribution network and a load insertion signal in response to the control relay circuit operating to insert the electrical load in the network. In response to the load removal signal, a second signal generator outputs a third signal having a third period to the data collection system. The second signal generator further outputs a fourth signal having a fourth period to the data collection system in response to the load insertion signal.

The data collection system includes a recorder and a communicating unit. The recorder stores the electrical load control data and the electrical load data during predetermined time intervals to respectively produce stored electrical load control data packets and stored electrical load data packets. In this manner, the apparatus collects and stores information relating to the control operations conducted by the control unit and the distribution or interruption of energy supplied to the electrical load prior to transmitting the information to the utility. In addition, the apparatus also functions as a conventional load control switch.

The recorder, typically nonvolatile memory, comprises a first storage device and a second storage device. The first storage device stores the first and second signals during each of the predetermined time intervals to produce the stored electrical load data packets. Likewise, the second storage device stores the third and fourth signals during each of the predetermined time intervals to produce the stored electrical load control data packets. The length of predetermined time intervals is typically defined by the utility to enable the collection of sufficient information for evaluating a load management strategy for a desired control scenario. Each of the stored electrical load data packets and the stored electrical load control data packets include timing data indicating the relative time for the start of each of the predetermined time intervals. The timing data typically includes a date and time stamp to ensure unique identification of the data packets.

The communicating unit sends the stored electrical load control data packets and the stored electrical load data packets to a data processing center for processing of the collected data. The data processing center, remotely located from the selected electrical load, accumulates the data packets from a selected set of the electrical loads within the network and processes the accumulated data packets to determine the effectiveness of the electrical load management system for a selected control scenario.

Advantageously, the communicating unit of the present invention typically is a modem interface connected to a customer's existing telephone line mounted proximate to the selected electrical load. The communicating unit transmits the stored electrical load control data packets and the stored electrical load data packets to the data processing center only when the existing telephone line is not utilized by the customer for other communication applications to prevent the communicating means from interrupting the customer's normal use of the existing telephone line. Consequently, the apparatus transmits the load control and energy consumption information via an existing communications network, the customer's telephone line, and thereby provides a utility with a low-cost two-way communication system for obtaining the data packets.

Briefly stated, the present invention operates by the method of (1) generating electrical load data in response to the distribution or interruption of energy to a selected electrical load in an electrical distribution network, (2) receiving a plurality of command signals from a command center remotely located from the selected electrical load, (3) controlling the selected electrical load in an electrical distribution network in response to a selected command signal, (4) generating electrical load control data in response to controlling the selected electrical load, (5) recording the electrical load control data and the electrical load data during predetermined time intervals, and (6) communicating the stored electrical load control data and the stored electrical load data to a data processing center remotely located from the selected electrical load. The data processing center processes the collected data to determine the effectiveness and reliability of the electrical load management system.

Accordingly, it is an object of the present invention to provide an improved electrical load control switch.

It is another object of the present invention to provide a load control switch for controlling an electrical load and monitoring the control operations and the distribution or interruption of energy supplied to the load.

It is another object of the present invention to communicate the load control information and energy consumption information to a data processing site via an existing communications system located proximate to the selected load.

It is another object of the present invention to provide a method for the accurate evaluation of the effectiveness of an electrical load management system including a group of load control switches.

These and other objects, features, and advantages of the present invention may be more clearly understood and appreciated from a review of the following detailed description of the disclosed embodiments and by reference to the appended drawings and claims.

DETAILED DESCRIPTION OF THE PREFERRED EMBODIMENT

Figure 1:
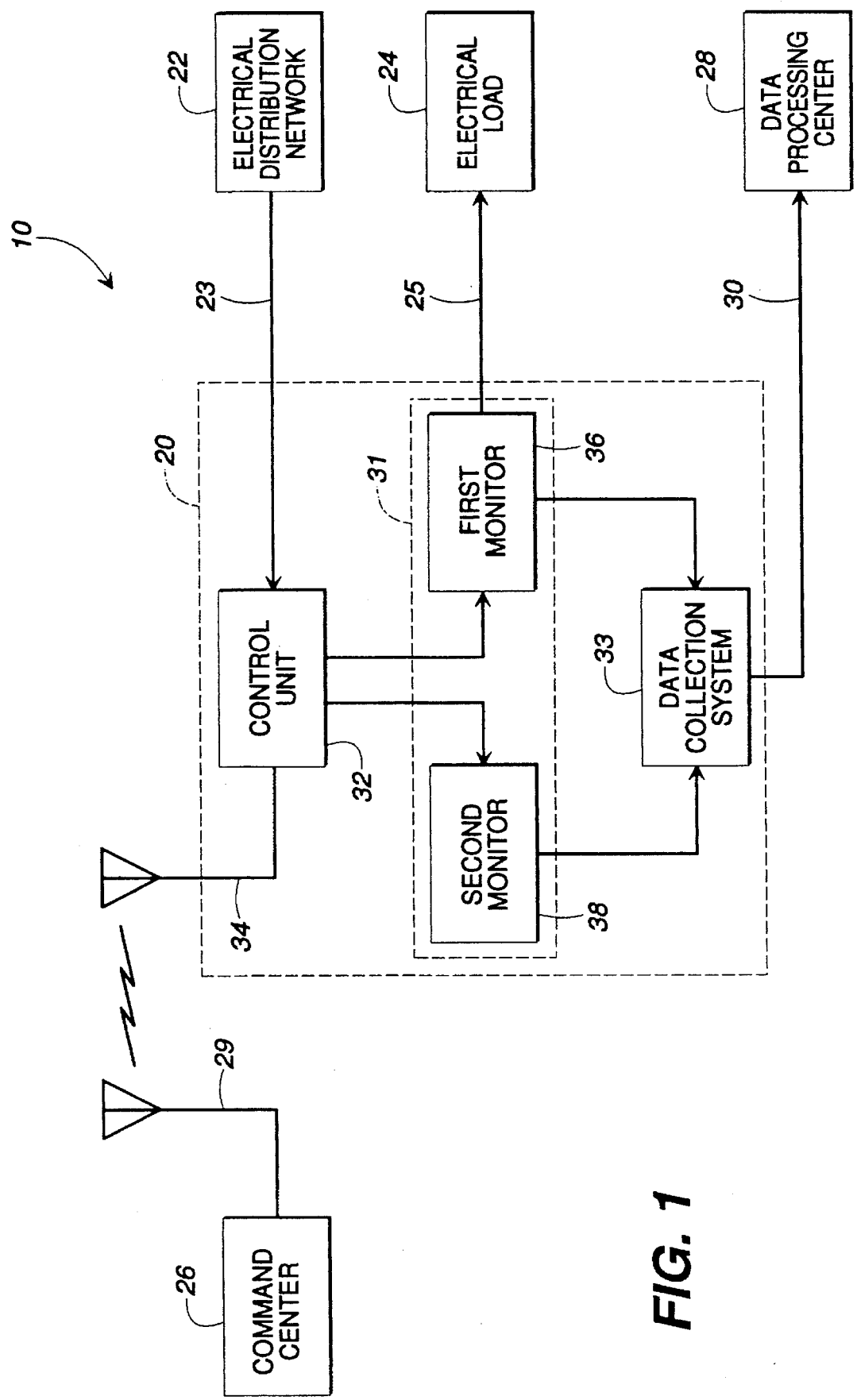
FIG. 1 is a block diagram of the present invention.

Referring now to the drawings, in which like numerals indicate like elements throughout the several figures, FIG. 1 illustrates an electrical load management system 10, including a load control switching and monitoring apparatus 20 connected between an electrical distribution network 22 and an electrical load 24. The apparatus 20 operates to control the energy supplied to the electrical load 24, which is associated with a particular utility customer, and monitors both the energy control operations and the power consumption of the electrical load 24. By monitoring power consumption, the apparatus 20 actually detects the distribution or interruption of energy supplied to the electrical load 24 by the network 22. The utility supplies electrical energy to the electrical load 24 by distributing energy from the electrical distribution network 22, via a power line 23, to the load control switching and monitoring apparatus 20 and, in response to a command transmitted by the utility, the apparatus 20 controls the output of electrical energy to the load 24 via a conductor 25.

The electrical load management system 10 further includes a command center 26 and a data processing center 28. The command center 26 transmits command signals to the load, control switching and monitoring apparatus 20 for initiating load control operations and thereby controls the amount of energy consumed by the utility's customers during peak power consumption periods. The data processing center 28 receives load control operation information and energy consumption information collected by the apparatus 20 via a communications link 30. Each of the command center 26 and the data processing center 28 is remotely located from the electrical load 24.

The command center 26 is preferably a wireless communications system, such as a radio frequency (RF) transmitter that transmits command signals via a transmitting antenna 29. Those persons skilled in the art will appreciate that the command center can also be implemented as a power line carrier system or as a telephone system to supply a communications link between the respective locations of the command center 26 and the apparatus 20.

An electrical utility utilizes the load control switching and monitoring apparatus 20 to implement and monitor an electrical load management system. The apparatus 20 operates as a conventional remotely controllable load control switch. Furthermore, by monitoring both the load control operations and the distribution or interruption of energy supplied to the electrical load for each of a selected set of electrical loads within the electrical distribution network, the utility can accurately evaluate the effectiveness of the electrical load management system for a variety of load control scenarios. The electrical utility can then efficiently utilize the electrical load management system for further control operations by applying the proper load management strategy to the particular control scenario faced by the utility.

The electrical utility can also utilize the load control switching and monitoring apparatus 20 to evaluate the natural diversity of electrical loads within the electrical distribution network by monitoring the network for selected time periods without conducting load control operations. In addition, the electrical utility can utilize the apparatus 20 to evaluate the behavior of the electrical distribution network before and after conducting load control operations.

The electrical utility services many customers and, accordingly, the electrical distribution network 22 distributes energy to each of a set of loads located within a defined geographical region. Those skilled in the art will appreciate that the utility will typically install the load control switching and monitoring apparatus 20 either on or adjacent to each load to be controlled to enable the utility to individually control the power consumed by each utility customer. Accordingly, it will be understood that the electrical load management system 10 includes a group of load control and monitoring devices, as represented by the load control switching and monitoring apparatus 20, and a group of loads, such as the electrical load 24.

The load control switching and monitoring apparatus 20 comprises a data interface 31 connected between a control unit 32 and a data collection system 33.

The control unit 32, also described as a control means, accepts electrical energy from the electrical distribution network 22 via the power line 23 and, furthermore, receives command signals from the command center 26 via a receiving antenna 34. The control unit 32, which operates as a conventional load control switch, removes the electrical load 24 from the network 22 upon receiving a selected command signal, thereby interrupting the supply of electrical energy to the electrical load 24. In response to another command signal, the control unit 32 restores the supply of electrical energy to the load 24 by inserting the load into the network 22.

The data interface 31, which includes a first monitor 36 and a second monitor 38, monitors the load control operations conducted by the control unit 32 and the distribution or interruption of energy supplied to the electrical load 24 by the network 22, and transmits certain information to the data collection system 33. The preferred circuitry for the implementation of the data interface 31 that connects the control unit 32 to the data collection system 33 is described in detail with respect to FIG. 3.

The first monitor 36, connected between the electrical load 24, the control unit 32, and the data collection system 33, generates electrical load data in response to the distribution or interruption of energy supplied by the network 22 via the control unit 32 to the load 24. The electrical load data, which includes information concerning the distribution or interruption of energy to a utility customer, is then sent to the data collection system 33. The first monitor 36 further operates as a conductor to distribute energy supplied by the network 22 via the control unit 32 to the load 24.

The second monitor 38, connected between the control unit 32 and the data collection system 33, generates electrical load control data in response to the control unit 32 operating to control the electrical load 24 in the electrical distribution network 22. The electrical load control data, which includes information concerning load control operations, is then supplied to the data collection system 33. The data collection system 33 accepts the electrical load data and the electrical load control data from the data interface 31 and transmits the data to the data processing center 28 via the communications link 30.

The data processing center 28 processes the electrical load data and the electrical load control data to determine the effectiveness of the electrical load management system 10. Specifically, the data processing center 28 receives and processes data collected by a group of load control and monitoring devices, represented by the apparatus 20, to determine the actual energy reduction achieved during a particular time interval in response to a command transmitted to a selected set of load control switch devices. The electrical load data and the electrical load control data are also useful for supporting reliability analyses of the individual load control switch devices within the electrical load management system, including an examination of utility command center transmitter coverage, load control switch failure rates, and customer or service personnel tampering of the units.

For the preferred embodiment, the control unit 32 is a type DCU-S2000A radio switch manufactured by Scientific Atlanta, Inc., Atlanta, Ga. Means of construction of the control means 32 are well known to those skilled in the art and details are available from the manufacturer. Furthermore, the structure and operation of an exemplary electrical load management system comprising a utility transmitter and a plurality of load control receivers, such as the control unit 32, for receiving coded information by radio from the command center is shown in U.S. Pat. No. 4,190,800 to Kelly, Jr. et al., assigned to the same assignee as the present invention, the disclosure of which is incorporated herein by reference and made a part hereof.

The preferred data collection system 33 is a type Universal Network Monitor manufactured by Scientific Atlanta, Inc., Atlanta, Ga. The Universal Network Monitor is typically used by a utility as a recorder to automatically record information concerning the operation of distribution equipment, including meters, capacitors, voltage regulators, and switches. The information is stored in time-stamped, user-defined intervals to enable load research recording by a utility. The Universal Network Monitor further includes the capability of dispatching the recorded information to the utility via the telephone system. Details of the operation and construction of the Universal Network Monitor are available from the manufacturer. Furthermore, the structure and operation of an exemplary data collection system for receiving and reporting utility meter readings from a remote location is shown in U.S. Pat. No. 4,086,434 to Bocchi, the disclosure of which is incorporated herein by reference and made a part hereof.

The data interface 31 is preferably housed within the same enclosure that houses the control unit 32. However, the control unit 32 and the data collection system 33 are preferably housed in separate enclosures. Nevertheless, each of the enclosures housing the combination of the data interface 31 and control unit 32, and the data collection system 33, is preferably physically located near the electrical load 24 to maintain short wiring connections between the interconnected units. Those skilled in the art will recognize that the functions provided by the data interface 31, the control unit 32 and the data collection system 33 could be combined and housed within a dedicated enclosure to minimize external wiring connections and to reduce enclosure manufacturing and installation expenses.

Figure 2:
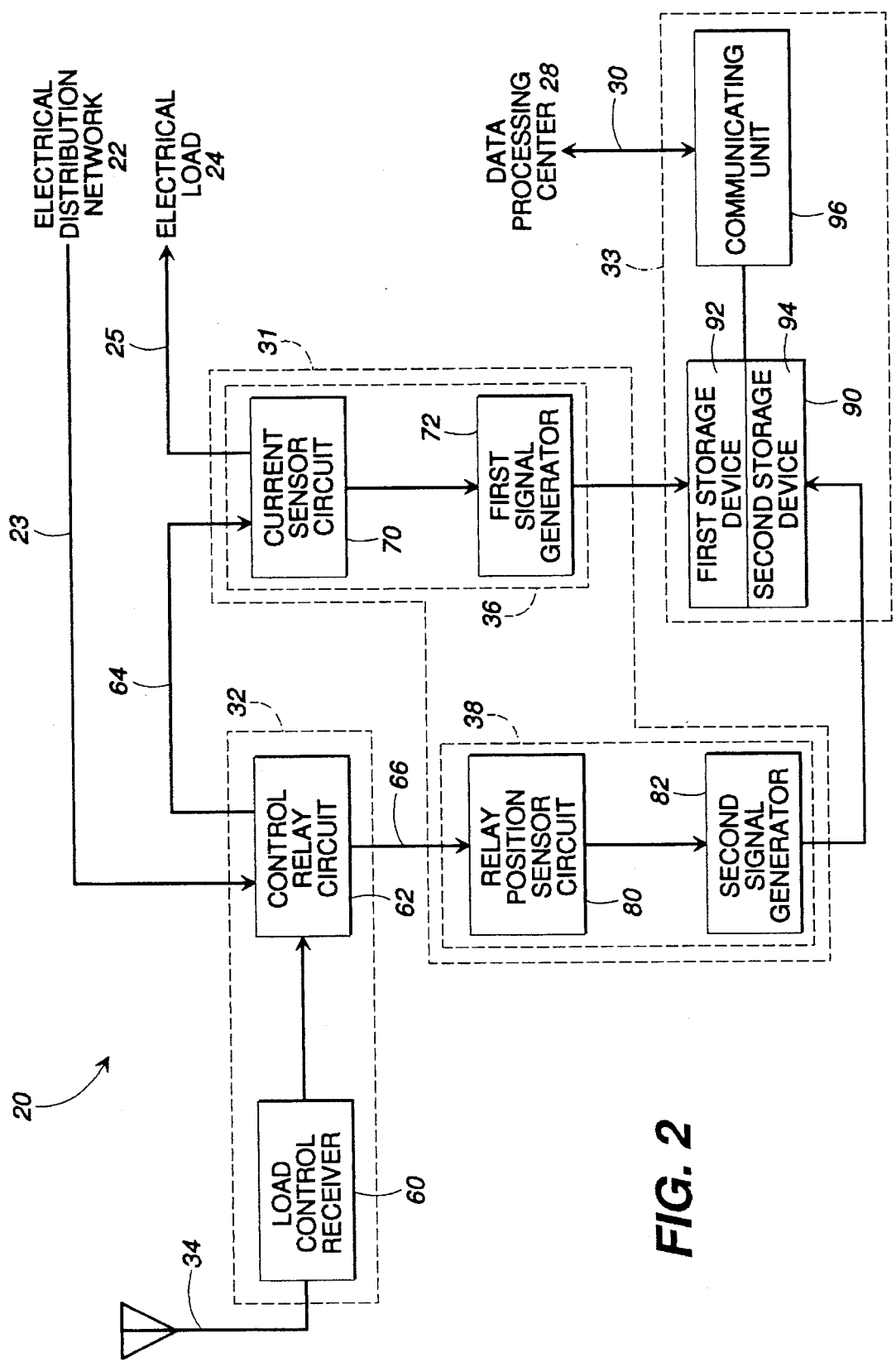
FIG. 2 is a detailed block diagram of the preferred embodiment of the present invention.

FIG. 2 illustrates the load control switching and monitoring apparatus 20 in more detail. Referring now to FIGS. 1–2, the command center 26, otherwise referred to as a means for transmitting a coded command signal, initiates an electrical load control operation by transmitting coded command signals via the transmitting antenna 29 to the load control switching and monitoring apparatus 20. The control unit 32, which includes a load control receiver 60 and a control relay circuit 62, receives the coded command signals via the receiving antenna 34. Each coded command signal includes addressing data and command data to enable the utility to manage and communicate with a selected set of the load control and switching devices.

The load control receiver 60 responds to only those coded command signals that include predetermined addressing data associated with the particular apparatus 20. In this manner, the utility can implement an electrical load management strategy that utilizes a selected set of the available load control switching and monitoring devices. For example, the utility can send a coded command signal that is decoded and responded to by a subset of the available load control devices, such as the apparatus 20, for controlling the energy supplied to loads either located in a specific geographical region of the electrical distribution network 22 or associated with a specific set of utility customers, such as residential customers.

In response to receiving a coded command signal including the addressing data associated with the load control receiver 60, the receiver outputs a decoded command signal to the control relay circuit 62 for initiating a load control operation. Specifically, the control relay circuit 62, otherwise described as a switching means, operates to remove the electrical load 24 in response to a selected decoded command signal and operates to restore the electrical load 24 in response to another selected decoded command signal. As those skilled in the art will recognize, the utility typically controls energy consumption during peak periods of power consumption by removing selected electrical loads from the distribution network for a particular time interval, thereby reducing the operating duty cycle of the controlled electrical loads.

The control relay circuit 62 accepts electrical energy via the power line 23 from the electrical distribution network 22. By removing the electrical load 24 in response to a selected decoded command signal, the control relay circuit 62 prevents any electrical energy from reaching the interface 31 via a conductor 64 and, in turn, the electrical load 24 does not receive electrical energy via the conductor 25. In this manner, the control means 32 interrupts the supply of electrical energy from the network 22 to the electrical load 24, thereby allowing the utility to individually control the amount of energy consumed by a utility customer. The control relay circuit 62 operates to restore the distribution of energy to the load 24 by inserting the load 24 within the network 24 in response to another decoded command signal.

The control relay circuit 62 preferably disconnects or restores the electrical load 24 only after the expiration of a time delay that operates to delay the start of a load control operation after the reception of the appropriate decoded command signal. A different time delay is utilized each time the control relay circuit 62 receives the selected decoded command signal to implement a load control operation because the length of the time delay is based upon a pseudo-random timing function. Consequently, the negative impact of instantaneously removing or restoring a large number of electrical loads within the electrical distribution network is prevented because nearly every control relay circuit 62 will have a different control operation start time in response to the selected decoded command signal. Accordingly, load control operations are always initiated in a gradual, graceful manner by the apparatus 20.

It will be appreciated that the time delay could be set to zero to provide instantaneous initiation of a load control operation after the reception of the appropriate decoded command signal. Accordingly, the control relay circuit 22 can be programmed to instantaneously implement a load control operation if required for certain load control scenarios.

Those persons skilled in the art will recognize that the control relay circuit 62 typically includes an electrical-mechanical relay, an electrical switch, or a triac switch.

The first monitor 36, which includes a current sensor circuit 70 and a first signal generator 72, is connected between the electrical load 24 and the control unit 32 for monitoring the distribution or interruption of energy supplied to the electrical load 24. The current sensor circuit 70, otherwise referred to as a current detection means, operates as a conductor by passing any electrical energy output by the control relay circuit 62, along a conductor 64, to the electrical load 24. Consequently, if the control relay unit 62 operates to maintain the load 24 within the network 22, the current sensor circuit receives energy via the conductor 64 and passes the energy to the load via the conductor 25.

Furthermore, the current sensor circuit 70 senses the presence of electrical energy supplied to the load 24 by monitoring the conductor 64 and, in response to the distribution of current, outputs a current detection signal to the first signal generator 72. The first signal generator 72, otherwise referred to as a first signal generating means, outputs a first signal having a first period to the data collection system 33 in response to the current detection signal. Consequently, the first signal generator 72 generates the first signal when current is supplied to the current sensor circuit 70 via the conductor 64.

In general, the current supplied to the load 24 via the first monitor 36 is interrupted in response to a control operation implemented by the control unit 32 to remove the load 24. The current sensor circuit 70 senses the interruption of the distribution of electrical energy to the load 24 by monitoring the conductor 64 and, in response to the interruption of current, generates a current interruption signal to the first signal generator 72. The first signal generator 72 then outputs a second signal having a second period to the data collection system 33. Accordingly, the first signal generator 72 generates the second signal when current supplied to the current sensor circuit 70 via the conductor 64 is interrupted.

In this manner, the first monitor 36 generates electrical load data, comprising the first signal and the second signal, in response to the distribution or interruption of electrical energy supplied to the load 24.

The current sensor circuit 70 is preferably implemented as a toroidal "O" ring surrounding a conductor connected to the electrical load 24. It will be appreciated that the current sensor circuit 70 can also achieve the result of sensing the presence of electrical energy supplied to the load 24 by detecting the voltage level of the energy signal supplied to the load 24 via the conductor 64. If the circuit 70 is implemented as a voltage detection circuit, the circuit 70 would output a detection signal to the first signal generator 72 in response to the detection of a certain voltage threshold of the energy signal carried by the conductor 64. Likewise, the circuit 70 could be implemented as a circuit that senses the presence of electrical energy supplied to the load 24 by monitoring the open or closed position of the relay within the control relay circuit 62 because the control relay circuit 62 operates to distribute or interrupt the supply of energy to the load 24.

The second monitor 38, which includes a relay position sensor circuit 80 and a second signal generator 82, generates electrical load control data in response to detecting the operations of control unit 32 to either remove the electrical load 24 from electrical distribution network 22 or to insert the load 24 into the network 22. The relay position sensor circuit 80, also described as a control operation detection means, connected to the control relay circuit 62 via a conductor 66, outputs a load removal signal upon detecting when the control relay circuit 62 operates to remove the electrical load 24. In response to the load removal signal, the second signal generator 82, otherwise described as a second signal generating means, outputs a third signal having a third period to the data collection system 33. Consequently, the second signal generator 82 generates the third signal when the electrical load 24 is removed from the network 22 by the control relay circuit 62.

The relay position sensor circuit 80 also senses, via the conductor 66, the operation of the control relay circuit 62 to insert the load 24 into the network 22 and, in response, generates a load insertion signal to the second signal generator 82. The second signal generator 82 then outputs a fourth signal having a fourth period to the data collection system 33. Accordingly, the second signal generator 82 generates the fourth signal when the electrical load 24 is inserted within the network 22 by the control relay circuit 62.

The data collection system 33 includes a recorder 90 and a communicating unit 96. The recorder 90, otherwise referred to as a recording means, stores each of the first signal, the second signal, the third signal, and the fourth signal. The recorder 90 includes a first storage device 92 and a second storage device 94, each preferably nonvolatile memory. The first storage device 92, otherwise referred to as a first storage means, stores the first and second signals during predetermined time intervals to produce stored electrical load data packets. Likewise, the second storage device 94, also described as a second storage means, stores the third and fourth signals during the predetermined time intervals to produce the stored electrical load control data packets.

The utility typically selects the length of the predetermined time interval in accordance with the control scenario of interest. The length of the predetermined time interval can be defined in time interval increments of one minute, five minutes, 15 minutes, or 30 minutes. The length of the predetermined time interval is either preprogrammed within the recorder 90 prior to installation of the apparatus 20 or is transmitted as a coded instruction signal to the apparatus 20 from the command center 26 or data processing center 28. For the disclosed embodiment, which includes 32 Kbytes of nonvolatile memory, the recorder 90 is capable of storing up to 35 days of load control information and energy consumption information that is segmented by predetermined time intervals each extending for 15 minutes.

The communicating unit 96 receives the stored data packets from the recorder 90 and transmits the stored electrical load data packets and the stored electrical load control data packets to the data processing center 28 via the communications link 30. The data processing center 28 accumulates these data packets for a selected set of the electrical loads under control and processes the data packets to determine the effectiveness of the electrical load management system 10.

The communicating unit 96 is preferably a modem interface connected to a two-way link such as a telephone system. In particular, the telephone system is preferably an existing telephone line mounted proximate to the electrical load, thereby enabling the utility to minimize communication system expenses by advantageously using the utility customer's telephone system connection. Typically, communications of the stored data packets extend from a minimum of 20 seconds up to approximately 2–3 minutes for the preferred embodiment including 32 Kbytes of nonvolatile memory.

To prevent the communicating unit 96 from interrupting any other communications applications utilizing the existing telephone line, the communicating unit 96 is programmed to communicate the stored electrical load data packets and the stored electrical load control data packets only when the existing telephone line is not presently in use for other communication applications. Furthermore, the communicating unit 96 is programmed to automatically disconnect from the telephone line if the customer attempts to initiate a telephone call during communication of the stored data packets. Accordingly, the communications operations of the communicating unit 96 is transparent to the utility customer.

It will be understood that the communicating unit 96 is not limited to the preferred modem interface connected to a telephone system. In particular, the communicating unit 96 can also include a wireless communication system, such as an RF communications system or an optical communications system.

The communicating unit 96 is programmed to transmit the stored electrical load data packets and the stored electrical load control data packets in response to a coded instruction signal transmitted by the data processing center 28 via the communications link 30 or by the command center 26. To enable the utility to send instructions to selected load control switching and monitoring devices, each instruction signal includes instruction address data and instruction command data. The communicating unit 96 is responsive to the instruction command data only for a predetermined information address data associated with the selected apparatus 20. In this manner, the utility can stagger the periods for collection of the stored data packets from the selected devices by individually instructing each apparatus 20 to transmit the stored data packets.

Furthermore, it will be understood that the communicating unit 96 also can be programmed to send the stored data packets to the data processing center in response to an internal preprogrammed instruction. The internal preprogrammed instruction typically instructs the communicating unit 96 to communicate with the data processing center 28 at a prescribed time to download all stored data packets. When a "busy" signal prevents regular communications via the preferred telephone system, the communicating unit 96 will automatically reset communication operations and continue to call the data processing center 28 until a communications link has been established or a preprogrammed number of calls are attempted without success. Specifically, the communicating unit 96 will continue to call the data processing center 28 at a call repetition frequency based upon a random number until the communicating unit 96 either establishes communication with the data processing center 28 or the communicating unit 96 initiates a preprogrammed number of calls without success.

The data processing center 28 is a host computer system, such as an IBM Personal Computer or a compatible personal computer. The data processing center 28 collects the stored data packets transmitted by each of the apparatus 20 and processes the collected data to evaluate the effectiveness of the electrical load management system. Alternatively, the data processing center 28 processes the collected data to conduct a reliability study of the electrical load management system. For example, an existing spread sheet software package, such as "LOTUS 123®", can be utilized to produce graphs and tables for the processed electrical load data and electrical load control data accumulated from the selected load control switching and monitoring devices.

In particular, the data processing center 28 determines the length of time that energy is supplied to a selected electrical load within a selected predetermined time interval, referred to as a "LOAD ON" time interval, by multiplying the total count of the first signal within the selected predetermined time interval by the first period. Likewise, the data processing center 28 determines the length of time that the selected electrical load is removed by the control means 32 from the network 22 within a selected predetermined time interval, referred to as a "CONTROL OPERATION ON" time interval, by multiplying the total count of the third signal within the selected predetermined time interval by the third period.

By combining each of the "LOAD ON" time interval associated with a selected set of apparatus 20, the data processing center 28 can develop a profile of the length of time that energy is supplied to the associated selected electrical loads 24 during the predetermined time interval. Likewise, by combining each of the "CONTROL OPERATION ON" time intervals associated with a selected set of apparatus 20, the data processing center 28 can develop a profile of the length of time that the associated selected electrical loads 24 were removed from the network 22. In this manner, the data processing center 28 can evaluate the effectiveness of the selected set of load control switching and monitoring devices within the electrical load management system by comparing the profile developed for the "CONTROL OPERATION ON" time intervals to the profile developed for the "LOAD ON" time intervals.

Figure 3:
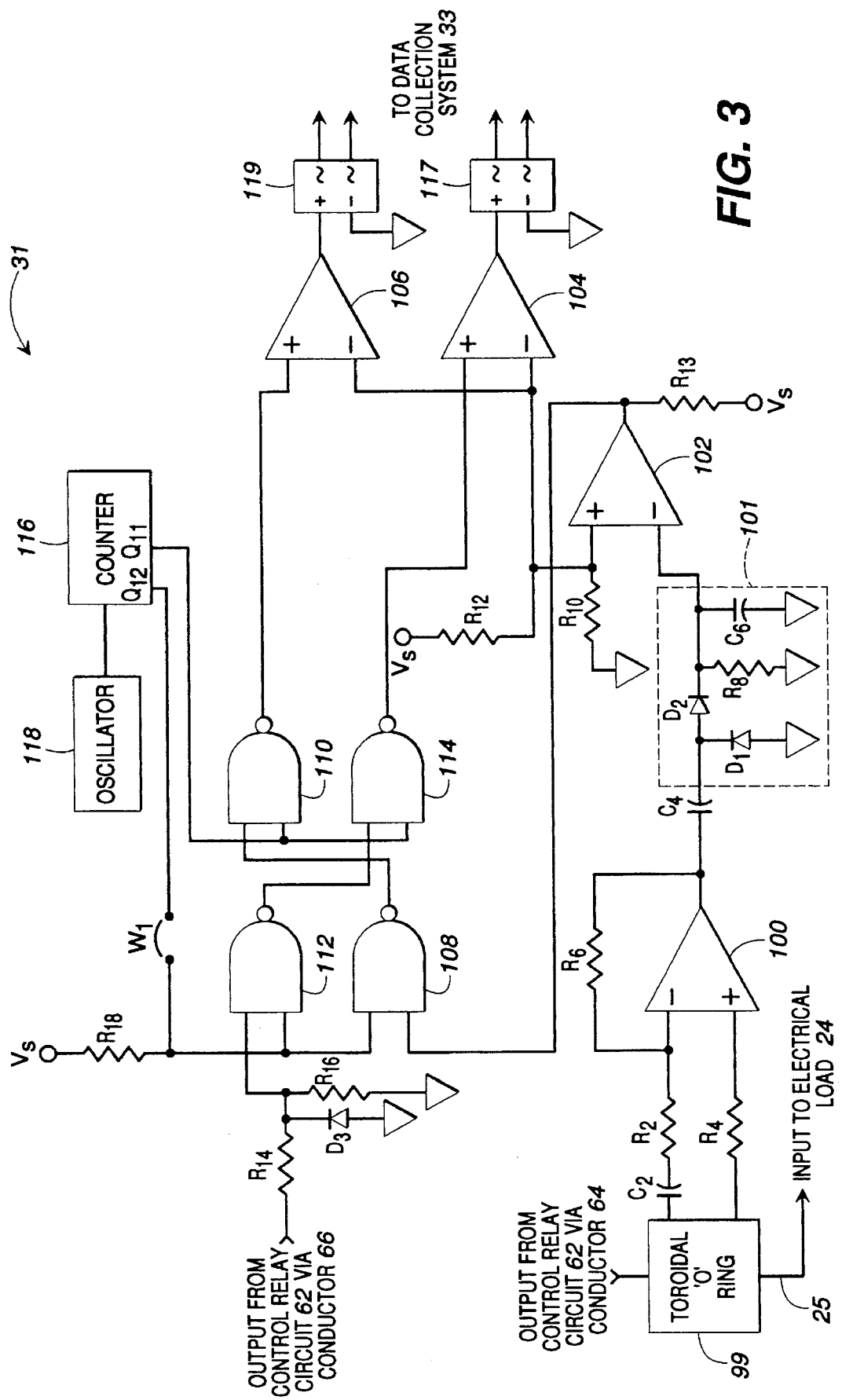
FIG. 3 is a schematic of the interface circuit connecting the control unit and the data collection system.

FIG. 3 shows a schematic for the preferred circuitry for the implementation of the data interface 31. Referring now to FIGS. 2–3, the output from the control relay circuit 62 is supplied via the conductor 64 to a toroidal 'O' ring 99 that senses the presence of current carried by the conductor 64. The output of the toroidal 'O' ring 99 is applied to each of the inverting and noninverting terminals of a current amplifier 100. In particular, the inverting terminal of the current amplifier 100 accepts the output from the toroidal 'O' ring 99 via a coupling capacitor $C_2$ and a resistor $R_2$. The inverting terminal of the current amplifier 100 accepts the output from the toroidal 'O' ring 99 via a resistor $R_4$.

The current amplifier 100 operates to amplify the current output by the control unit 32 via line 64 to insure an adequate current level for processing by the circuitry of the interface 31. The gain of the current amplifier 100 is set by the ratio of a feedback resistor $R_6$ to the resistor $R_2$. The current amplifier 100 is preferably a model LM358N operational amplifier manufactured by National Semiconductor Corporation, Santa Clara, Calif.

The amplified output 100 is AC-coupled by a capacitor $C_4$ and supplied to a peak detector 101 comprising a pair of diodes $D_1$ and $D_2$, a resistor $R_8$, and a storage capacitor $C_6$. The output of the peak detector 101, which is a signal having a peak value of the amplified output of the current amplifier 100, is applied to the inverting terminal of a comparator 102. The noninverting terminal of the comparator 102 is connected to a voltage divider that sets the reference voltage for the comparator 102. The voltage divider comprises a resistor $R_{10}$ tied to ground and a resistor $R_{12}$ connected to a voltage source $V_s$. The open collection output of the comparator 102 is pulled-up by a resistor $R_{13}$ tied to the voltage source $V_s$.

If the peak value of the output of the current amplifier 100 exceeds the reference voltage, the comparator 102 toggles and sends a control signal to an input of a NAND gate 108. For the preferred embodiment, the output of the peak detector 101 forces the comparator 102 to toggle and supply a TTL low signal to the input of the NAND gate 108 when current is supplied to the data interface 31 via the line 64. Otherwise, the output of the comparator 102 remains at a TTL high level, thereby indicating that current is not supplied to the data interface 31 via the line 64.

The output of the NAND gate 108, which is connected as an input to a NAND gate 110, is always set to a TTL high level when the output of the comparator 102 is set to a TTL low level. Accordingly, the output of the NAND gate 110 is determined by a $Q_{11}$ output of a counter 116, which is the other input to the NAND gate 110, when the output of the NAND gate 108 is a TTL high level.

The counter 116 divides the master clock frequency supplied by an oscillator 118 to generate outputs having a frequency derived from the master clock frequency. For example, the output $Q_{11}$ supplies a pulsed signal having a frequency $f_1$, which is twice the frequency of an output $Q_{12}$ of the counter 116. In other words, the pulsed signal generated by the output $Q_{12}$ has a frequency $f_2$ that is one-half the frequency of the pulsed signal generated by the output $Q_{11}$. Therefore, a pulsed signal having the frequency $f_1$ is output by the NAND gate 110 when the output of the NAND gate 108 is a TTL high level.

The output of the NAND gate 110 is applied to the noninverting terminal of a comparator 106 and a voltage reference set by the voltage divider comprising the resistors $R_{10}$ and $R_{12}$ is connected to the inverting terminal of the comparator 106. When the NAND gate 110 outputs the pulsed signal having the frequency $f_1$, the open collector output of the comparator 106 sends a toggling signal that pulses the positive port of a bridge 119 at a frequency determined by the frequency $f_1$. The negative port of the bridge 119 is connected to ground. In response to this pulsed output of the comparator 106, the bridge 119 sends the first signal to the data collection system 33. For the preferred embodiment, the first signal is a pulsed signal having the frequency $f_1$ and the first period of $1/f_1$.

In this configuration, the bridge 119 operates to present the proper signal polarity to the data collection system 33 because the preferred collection system 33 is a polarity sensitive device.

In contrast, if the output of the comparator 102 is a TTL high level, which indicates that the distribution of current via line 64 has been interrupted, the output of the NAND gate

108 is determined by the output $Q_{12}$ of the counter 116. In other words, the output of the NAND gate 108 toggles at the frequency $f_2$ when the toggling output $Q_{12}$ and a TTL high level signal are applied as inputs to the NAND gate 108. Accordingly, the NAND gate 110 accepts as inputs the pulsed signal having the frequency $f_1$ supplied by the output $Q_{11}$ and the pulsed signal having the frequency $f_2$ output by the NAND gate 108.

In response to these inputs, the NAND gate 110 outputs a pulsed signal having the frequency $f_2$ because the outputs $Q_{11}$ and $Q_{12}$ of the counter 116 are synchronized and the frequency $f_1$ is twice the frequency of frequency $f_2$. The output of the NAND gate 110 forces the comparator 106 to toggle at a frequency set by the frequency $f_2$. The toggling output of the comparator 106 pulses the positive port of the bridge 119 at the frequency $f_2$, thereby sending the second signal to the data collection system 33. The second signal is preferably a pulsed signal having the frequency $f_2$ and the first period of $1/f_2$.

In this manner, a first signal is supplied to the recorder 90, specifically the first storage device 92, when the current sensor circuit 70 senses current supplied by the current relay circuit 62 via the conductor 64. Likewise, the second signal is supplied to the first storage device 92 when the current sensor circuit 70 fails to detect current on the conductor 64, thereby indicating an interruption of current supplied to the load 24 by the network 22 via the control relay circuit 62.

The output from the control relay circuit 62 is supplied via the conductor 66 to the input of the relay position sensor circuit 80, which includes an input protection circuit of a diode $D_3$ and a voltage divider formed by resistors $R_{14}$ and $R_{16}$. For the preferred control relay circuit 62, which includes a control relay, the output of the control relay circuit 62 is a TTL low level when the control relay is closed, thereby indicating that the control relay is operative to remove the electrical load 24 from the network 22. Alternatively, the output of the control relay circuit 62 is a TTL high level signal when the control relay is open, thereby indicating that the control relay is operative to insert the load 24 within the network 22.

A NAND gate 112 accepts as an input the output of the control relay circuit 62 via the protection circuitry and, when the output is set to a TTL low level, the NAND gate 112 always outputs a TTL high level signal as an input to a NAND gate 114. In response to the TTL high level signal input, the NAND gate 114 outputs a pulsed signal having the frequency $f_1$ because the other input of the NAND gate 114 is connected to the toggling output $Q_{11}$ of the counter 116.

The output of the NAND gate 114 is applied to the noninverting terminal of a comparator 104, thereby forcing the comparator 104 to toggle and output a pulsed signal having the frequency $f_1$ because the output of the NAND gate 114 exceeds the voltage reference applied to the inverting terminal of the comparator 104. The voltage reference is determined by the voltage divider formed by the combination of the resistors $R_{10}$ and $R_{12}$. The open collector output of the comparator 104 pulses the positive port of a bridge 117 at a frequency set by the frequency $f_1$. The negative port of the bridge 117 is connected to ground. In response to this pulsed output of the comparator 106, the bridge 117 sends the third signal to the data collection system 33. For the preferred embodiment, the third signal is a pulsed signal having the frequency $f_1$ and the third period of $1/f_1$.

In this configuration, the bridge 117 operates to present the proper signal polarity to the data collection system 33 because the preferred collection system 33 is a polarity sensitive device.

When the output of the control relay circuit 62 is a TTL high level, the output of the NAND gate 112 is determined by the output $Q_{12}$ of the counter 116, which is applied as an input to the NAND gate 112. Accordingly, a pulsed signal having the frequency $f_2$ is output by the NAND gate 112 and applied as an input to the NAND gate 114. The NAND gate 114, which also accepts as an input the output $Q_{11}$ of the counter 116, outputs a pulsed signal having the frequency $f_2$ because the outputs $Q_{11}$ and $Q_{12}$ are synchronized and the frequency associated with the output $Q_{11}$, the frequency $f_1$, is twice the frequency of the output $Q_{12}$, the frequency $f_2$.

The output of the NAND gate 114 forces the comparator 104 to toggle at the frequency $f_2$, thereby pulsing the positive port of the bridge 117. In response, the bridge 117 outputs the fourth signal to the data collection system 33. The fourth signal is preferably a pulsed signal having the frequency $f_2$ and the fourth period of $1/f_2$.

In this manner, the third signal is supplied to the recorder 90, specifically the second storage device 94, when the control unit 32 operates to remove the electrical load 24 from the electrical distribution network 22. In addition, the fourth signal is supplied to the second storage device 94 when the control unit 32 operates to restore the load 24 within the network 22.

For the preferred embodiment, the binary counter 116 is a model 4040, a 12-stage binary ripple counter commonly manufactured by the semiconductor industry, such as the MC54/74HC4040 model manufactured by Motorola Semiconductor Products, Inc., Austin, Tex.

Each of the comparators 102, 104, and 106 is preferably a model LM339 comparator manufactured by National Semiconductor Corporation, Santa Clara, Calif. Each of bridges 117 and 119 is preferably a model IDMB20, manufactured by International Rectifier, El Segundo, Calif. The circuitry for the construction of the oscillator 118 is well known in the art.

For the preferred interface circuitry of the data interface 31, each of the first signal and the third signal is set to the frequency $f_1$ and, accordingly, the first period is equal to the third period. Likewise, each of the second signal and the fourth signal is set to the frequency $f_2$ and, accordingly, the second period is equal to the fourth period.

A jumper $w_1$ connects the output $Q_{12}$ of the counter 116 to an input for each of the NAND gates 108 and 112. If the jumper $w_1$ is opened, this input for each of the NAND gates 108 and 112 is hardwired to a TTL high level signal via a pull-up resistor $R_{18}$ connected to the voltage source $V_s$. Thus, the output $Q_{12}$ is disconnected from the remaining circuitry of the data interface 31 when the jumper $w_1$ is opened.

Each of the second signal and the fourth signal becomes a nonpulsed signal having a fixed voltage when the jumper $w_1$ is opened and the counter 116 is prevented from supplying the output $Q_{12}$ as an input to each of the NAND gates 108 and 112. Accordingly, each of the second period and the fourth period is set to zero when the jumper $w_1$ is opened. In contrast, each of the first signal and the third signal is a pulsed signal having the frequency $f_1$ when the jumper $w_1$ is opened because the output $Q_{11}$ remains connected as an input to each of the NAND gates 110 and 114.

For example, if each of the inputs applied to the NAND gate 108 is a TTL high level, then the output of the NAND gate 108 is a TTL low level that is subsequently applied as an input to the NAND gate 110. Accordingly, the NAND gate 110 outputs a TTL high level signal to the noninverting terminal of the comparator 106 regardless of the state of the output $Q_{11}$, which is the other input to the NAND gate 110. The output of the comparator 106, which is applied to the noninverting port of the bridge 119, is a positive voltage level signal when the output of the NAND gate 110 is a TTL high level signal. Therefore, the bridge 119 sends the second signal, a nonpulsed signal having a fixed positive voltage, to the data collection system 33 when the jumper $w_1$ is opened. The generation of a nonpulsed signal as the fourth signal when the jumper $w_1$ is opened is similar to the above-described generation of the second signal.

Those persons skilled in the art will appreciate that the processing requirements for the data processing center 28 are reduced by opening the jumper $w_1$ and setting each of the second signal and the fourth signal to a signal having no pulses because the remaining signals, the first signal and the third signal, are pulsed signals set to a common frequency $f_1$. For example, certain processing of the stored electrical load data packets and the stored electrical load control data packets can be based upon the absence or presence of pulsed signals for a particular recording interval.

Figure 4:
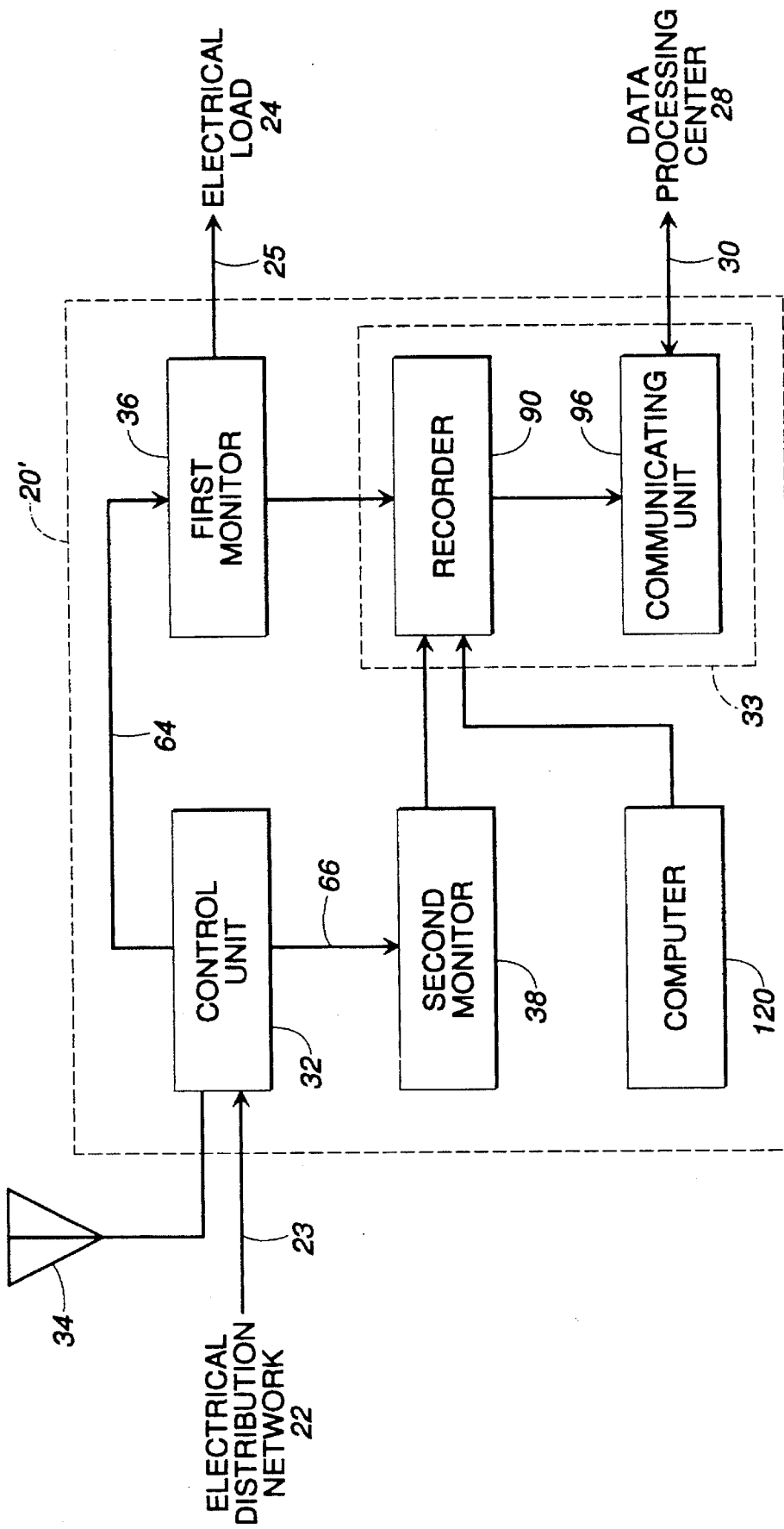
FIG. 4 is a block diagram of another disclosed embodiment of the present invention.

For another disclosed embodiment shown in FIG. 4, the apparatus 20' includes an internal computer 120 connected to the recorder 90 for processing the stored electrical load data packets and the stored electrical load control data packets prior to sending the stored data packets to the data processing center 28. In particular, the computer 120, otherwise described as a computer means, is programmed to calculate a "LOAD ON/LOAD OFF" ratio, which represents the ratio of a time interval that energy is supplied to a selected electrical load within a particular predetermined interval to a time interval that energy is not supplied to the selected electrical load within the same predetermined time interval. Likewise, the computer 120 is programmed to calculate a "CONTROL ON/CONTROL OFF" ratio, which represents the ratio of a time interval that the selected electrical load is removed from the network 22 within a particular predetermined time interval to a time interval that the selected electrical load is inserted within the network 22 within the same predetermined time interval. The computer 120 then stores each "LOAD ON/LOAD OFF" ratio and "CONTROL ON/CONTROL OFF" ratio within the recorder 90 prior to sending the ratios to the data processing center 28.

When the computer 120 completes the calculation of the "LOAD ON/LOAD OFF" ratio and the "CONTROL ON/CONTROL OFF" ratio for a set of selected predetermined time intervals, the communicating unit 96 transmits the ratios to the data processing center 28 for additional processing and evaluation. In this manner, the computer 120 locally processes the stored data packets associated with the electrical load 24, thereby further reducing the connect time between the communicating unit 96 and the data processing center 28 by reducing the quantity of transmitted information.

Figure 5:
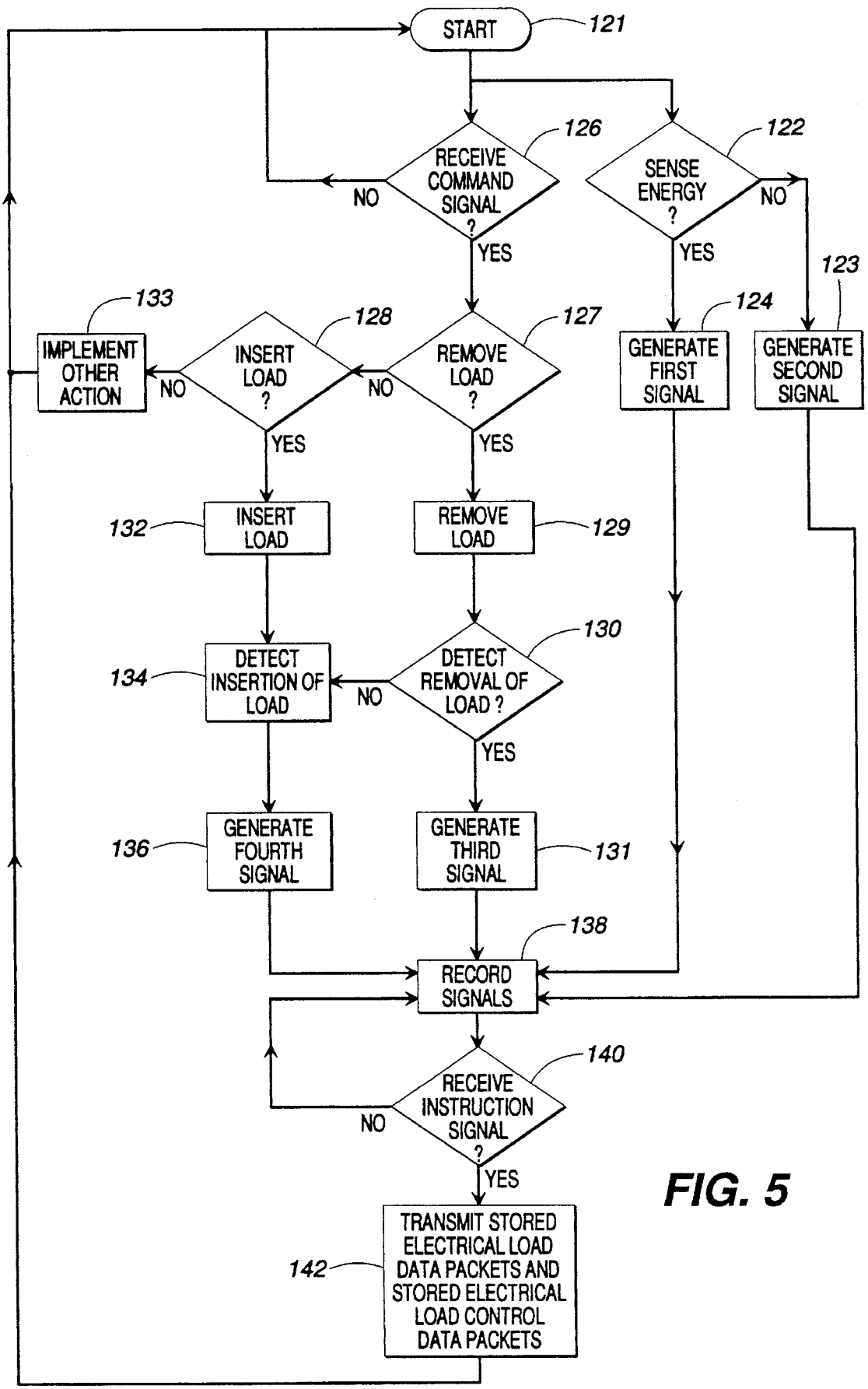
FIG. 5 is a flow chart diagram showing the steps of a method for determining the effectiveness of an electrical load management system.

FIG. 5 illustrates a flow chart diagram showing a sequence of steps for the method for controlling the electrical load and monitoring the load control operations and the energy supplied to the load. Referring now to FIGS. 1, 2, and 5, starting at step 121, an inquiry is conducted during step 122 to determine whether the current sensor circuit 70 has sensed the application of electrical energy to the electrical load 24. If energy from the electrical distribution network 22 is not supplied to the electrical load 24 via the control unit 32, the current sensor circuit 70 generates a current interruption signal and "No" branch is followed to step 123. In response to the current interruption signal, the first signal generator 72 transmits the second signal to the recorder 90 during step 123.

If the current sensor circuit 70 senses the flow of current to the electrical load 24 via the control unit 32 during step 122, the "Yes" branch is followed to step 124, and the current sensor circuit 70 sends the current distribution signal to the first signal generator 72. In response, the first signal generator 72 generates the first signal at step 124 for storage by the recorder 90.

In parallel with the current sensing operation conducted at step 122, an inquiry is also conducted during step 126 to determine whether the load control receiver 60 has received a command signal from the command center 26. If the load control receiver 60 has not received a command signal, the "No" branch is followed to the start step 121 and the command signal inquiry loop begins again. However, if the load control receiver 60 receives a command signal during step 126, the "Yes" branch is followed to step 127.

During step 127, an inquiry is conducted to determine whether the command signal instructs the control unit 32 to remove the electrical load 24 from the electrical distribution network 22. If the received command signal instructs the control unit 32 to remove the electrical load 24, the "Yes" branch is followed to step 129 and the control relay circuit 62 operates to remove the electrical load 24.

In contrast, if the received command signal does not require the removal of the electrical load 24, the "No" branch is followed to step 1-28. At step 128, an inquiry is conducted to determine whether the command signal instructs the control unit 32 to insert the electrical load 24 within the electrical distribution network 22. If the received command signal instructs the control unit 32 to insert the electrical load 24, the "Yes" branch is followed to step 132 and the control relay circuit 62 operates to insert the load 24. However, if the received command signal does not require the insertion of the load, the "No" branch is followed to step 133 and an appropriate action is implemented by the apparatus 20 in response to the command signal.

The relay position sensor circuit 80 operates to detect whether the control relay circuit 62 removed the electrical load 24 during step 129 or inserted the load 24 during step 132. If the control relay circuit 62 did not remove the electrical load 24 during step 129, the "No" branch is followed to step 134 and the relay position sensor circuit 80 generates the load insertion signal in response to detecting the load 24. Likewise, if the control relay circuit 62 inserted the load 24 during step 132, the relay position sensor circuit 80 generates the load insertion signal during step 134. In response to the load insertion signal, the second signal generator 82 outputs a fourth signal during step 136 to the recorder 90.

However, if the relay position sensor circuit 80 detects the removal of the electrical load 24 by the control relay circuit 62 during step 130, the circuit 80 outputs the load removal signal to the second signal generator 82. In response, the second signal generator 82 generates the third signal to the recorder 90 during step 131.

The recorder 90 records each of the first, second, third, and fourth signals during predetermined time intervals to produce stored electrical load data packets and stored electrical control data packets during step 138. If the communicating unit 96 does not receive an instruction signal for transmitting the stored data packets to the data processing center 28 during step 140, the recorder 90 continues to store the first, second, third, and fourth signals during consecutive predetermined time intervals. However, if the communicating unit 96 receives the instruction signal during step 140, the communicating unit 96 transmits the stored electrical load data packets and the stored electrical load reduction data packets to the data processing center 28 during step 142. Upon the conclusion of the transmission, the method begins again at start step 121.

As will be evident from the foregoing description, certain aspects of the invention are not limited to the particular details of the examples illustrated, and it is therefore contemplated that other modifications or applications will occur to those skilled in the art. It is accordingly intended that the claims shall cover all such modifications and applications as do not depart from the true spirit and scope of the invention.

What is claimed is:

1. In an electrical load management system, said system including a plurality of an improved load control switching and monitoring apparatus, each of said improved apparatus located proximate to an electrical load to be controlled, and a data processing center remotely located and separated from said electrical load, for causing electrical load reductions in an electrical distribution network and monitoring each of said electrical load reductions and energy supplied to said electrical load, said apparatus comprising:

control means for controlling said electrical load in said electrical distribution network in response to command signals transmitted by a command center, said command center remotely located from said electrical load;

first monitoring means for generating electrical load data in response to detecting the distribution and interruption of said energy to said electrical load;

second monitoring means for generating electrical load control data in response to detecting the control operation of said control means; and data collection means for collecting said electrical load data and said electrical load control data and communicating said electrical load data and said electrical load control data to said data processing center, said data processing center operative to process said electrical load data and said electrical load control data to determine the effectiveness of said electrical load management system.

2. The apparatus of claim 1 wherein said data collection means comprises:

recording means for recording said electrical load control data and said electrical load data during a plurality of predetermined time intervals to produce a plurality of electrical load control data packets and a plurality of electrical load data packets; and communicating means for transmitting said plurality of electrical load-control data packets and said plurality of electrical load data packets to said data processing center.

3. The apparatus of claim 2, wherein each of said plurality of said electrical load control data packets contains information relating to the operating status of said control means during one of said predetermined time intervals.

4. The apparatus of claim 3, wherein each of said plurality of said electrical load control data packets include timing data indicating the relative time for the start of said one of said predetermined time intervals.

5. The apparatus of claim 2, wherein each of said plurality of said electrical load data packets contains information relating to whether said energy is interrupted and supplied to said electrical load during one of said predetermined time intervals.

6. The apparatus of claim 5, wherein each of said plurality of said electrical load data packets includes timing data indicating the relative time for the start of said one of said predetermined time intervals.

7. The apparatus of claim 6, wherein said communicating means transmits said plurality of said electrical load control data packets and said plurality of electrical load data packets to said data processing center in response to an instruction signal transmitted by said data processing center.

8. The apparatus of claim 7, wherein said data processing center processes said plurality of electrical load control data packets and said electrical load data packets to determine the effectiveness of said electrical load management system.

9. The apparatus of claim 1, wherein said data collection means transmits said electrical load control data and said electrical load data to said data processing center in response to an instruction signal transmitted by said data processing center.

10. The apparatus of claim 1, wherein said data collection means transmits said electrical load control data and said electrical load data to said data processing center in response to an internal preprogrammed instruction.

11. The apparatus of claim 1, wherein said data collection means includes a wireless communications system.

12. The apparatus of claim 1, wherein said data collection means includes a modem interface connected to a telephone system.

13. The apparatus of claim 1, wherein said command center transmits said command signals to said control means via a wireless communications system.

14. The apparatus of claim 1, wherein said command center transmits said command signals to said control means via a power line carrier system.

15. The apparatus of claim 1, wherein said command center transmits said command signals to said control means via a telephone system.

16. In an electrical load management system, said system including means for transmitting coded command signals for causing electrical load reductions from an electrical distribution network and an improved load control switching and monitoring apparatus located proximate to each of a plurality of electrical loads to be controlled, said improved apparatus comprising:

control means responsive to said coded command signals to remove and insert a selected one of said plurality of said electrical loads in said electrical distribution network;

first monitoring means for producing electrical load data in response to detecting the distribution or interruption of energy to said selected electrical load;

second monitoring means for producing electrical load control data in response to detecting the operation of said control means to remove said selected electrical load from said electrical distribution network and to insert said selected electrical load from said electrical distribution network;

recording means for recording said electrical load control data and said electrical load data during a plurality of predetermined time intervals to produce a plurality of stored electrical load control data packets and a plurality of stored electrical load data packets; and communicating means for communicating said plurality of said stored electrical load control data packets and said plurality of said stored electrical load data packets to a data processing center, said data processing center, responsive to receiving said electrical load control data packets and said electrical load data packets, for processing said electrical load data and said electrical load control data to determine the effectiveness of said electrical load management system, said data processing center remotely located and separated from said electrical loads.

17. The apparatus of claim 16, wherein said control means comprises:
   a load management receiver for decoding said coded command signals to produce decoded command signals; and
   switching means for removing said selected electrical load from said electrical distribution network in response to a selected one of said decoded command signals and inserting said selected electrical load within said electrical distribution network in response to another one of said decoded command signals.

18. The improvement of claim 17, wherein each of said coded command signals comprises address data and command data, wherein said load management receiver is responsive to said command data only for predetermined address data.

19. The apparatus of claim 17, wherein said first monitoring means comprises:
   current detection means for generating a current distribution signal in response to sensing the distribution of current to said selected electrical load and a current interruption signal in response to sensing the interruption of current to said selected electrical load; and
   first signal generating means for generating a first signal having a first period in response to said current distribution signal and a second signal having a second period in response to said current interruption signal.

20. The apparatus of claim 19, wherein said second monitoring means comprises:
   control operation detection means for generating a load removal signal in response to said switching means operating to remove said selected electrical load from said electrical distribution network and a load insertion signal in response to said switching means operating to insert said selected electrical load in said electrical distribution network; and
   second signal generating means for generating a third signal having a third period in response to said load removal signal and a fourth signal having a fourth period in response to said load insertion signal.

21. The apparatus of claim 20, wherein said recording means comprises a first storage means and a second storage means, said first storage means for storing said first signal and said second signal during each of said plurality of said predetermined time intervals to produce said plurality of said stored electrical load data packets and said second storage means for storing said third signal and said fourth signal during each of said plurality of said predetermined time intervals to produce said plurality of said stored electrical load control packets.

22. The apparatus of claim 21, wherein each of said plurality of said stored electrical load control data packets and each of said plurality of said electrical load data packets includes timing data indicating the relative time for the start of each of said predetermined time intervals.

23. The apparatus of claim 22, wherein each of said first signal, said second signal, said third signal, and said fourth signal is a pulsed signal.

24. The apparatus of claim 23, wherein said first period is equal to said third period and said second period is equal to said fourth period.

25. The apparatus of claim 24, wherein said data processing center determines a "LOAD ON" time interval indicating the length of time that energy is supplied to said selected electrical load by said electrical distribution network within a selected predetermined time interval by multiplying the total pulse count of said first signal within said selected predetermined time interval by said first period.

26. The apparatus of claim 23, wherein said data processing center determines a "CONTROL OPERATION ON" time interval indicating the length of time that said selected electrical load is removed by said control means from said electrical distribution network within a selected predetermined time interval by multiplying the total pulse count of said third signal within said selected predetermined time interval by said third period.

27. The apparatus of claim 22, wherein said communicating means includes a wireless communications system.

28. The apparatus of claim 22, wherein said communicating means includes a modem interface connected to a telephone system.

29. The apparatus of claim 28, wherein said telephone system comprises an existing telephone line mounted proximate to said selected electrical load, said telephone line also utilized for other communication applications other than communicating said plurality of said stored electrical load control data packets and said plurality of said stored electrical load data packets to said data processing center.

30. The apparatus of claim 29, wherein said communicating means does not interrupt any of said other communication applications utilizing said existing telephone line to communicate with said data processing center.

31. The apparatus of claim 30, wherein said communicating means transmits said plurality of said stored electrical load control data packets and said plurality of said stored electrical load data packets to said data processing center in response to an internal preprogrammed instruction.

32. The apparatus of claim 30, wherein said communicating means transmits said plurality of said stored electrical load control data packets and said plurality of said stored electrical load data packets to said data processing center in response to a coded instruction signal transmitted by said data processing center.

33. The apparatus of claim 32, wherein each of said coded instruction signals comprises instruction address data and instruction command data, said communicating means being responsive to said instruction command data only for predetermined address data.

34. The apparatus of claim 16, comprising a computing means for processing said plurality of said stored electrical load reduction data packets and said plurality of said stored electrical load data packets.

35. The apparatus of claim 34, wherein said computing means is operative to calculate a LOAD ON/LOAD OFF ratio representing the ratio of a time interval that said energy is supplied to said selected electrical load within a selected predetermined time interval to a time interval that said energy is interrupted to said selected electrical load within said selected predetermined time interval.

36. The apparatus of claim 35, wherein said computing means is operative to calculate a CONTROL ON/CONTROL OFF ratio representing the ratio of a time interval that said selected electrical load is removed from said electrical distribution network within a selected predetermined time interval to a time interval that said selected electrical load is inserted within said electrical distribution network within said selected predetermined time interval.

37. The apparatus of claim 36, wherein said communicating means transmits said LOAD ON/LOAD OFF ratio and said CONTROL ON/CONTROL OFF ratio to said data processing center for each of a plurality of said selected predetermined time intervals.

38. In an electrical load management system, said system including means for transmitting coded command signals for causing electrical load reductions from an electrical distribution network and an improved load control switching and monitoring apparatus located proximate to a selected one of a plurality of electrical loads to be controlled, said improved apparatus comprising:

a load management receiver for decoding said coded command signals to produce decoded command signals;

switching means for removing said selected electrical load from said electrical distribution network in response to a selected one of said decoded command signals and inserting said selected electrical load within said electrical distribution network in response to another one of said decoded command signals;

current detection means for generating a current supply signal in response to sensing the distribution of current to said selected electrical load and a current interruption signal in response to sensing the interruption of current to said selected electrical load;

control operation means for generating a load removal signal in response to said switching means operating to remove said selected electrical load from said electrical distribution network and a load insertion signal in response to said switching means operating to insert said selected electrical load in said electrical distribution network;

first signal generating means for generating a first signal having a first period in response to said current supply signal and a second signal having a second period in response to said current interruption signal;

second signal generating means for generating a third signal having a third period in response to said load removal signal and a fourth signal having a fourth period in response to said load insertion signal;

first storage means for storing said first signal and said second signal during each of a plurality of predetermined time intervals to produce a plurality of stored electrical load data packets;

second storage means for storing said third signal and said fourth signal during each of said plurality of said predetermined time intervals to produce a plurality of stored electrical load control packets; and communicating means for communicating said plurality of said stored electrical load control data packets and said plurality of said stored electrical load data packets to a data processing center remotely located from said selected electrical load in response to a coded instruction signal transmitted by said data processing center.

39. The apparatus of claim 38, wherein each of said plurality of said stored electrical load control data packets and each of said plurality of stored electrical load data packets includes timing data indicating the relative time for the start of each of said predetermined time intervals.

40. The apparatus of claim 39, wherein said communicating means includes a modem interface connected to a telephone system.

41. The apparatus of claim 40, wherein said telephone system comprises an existing telephone line located proximate to said selected electrical load, said telephone line also utilized for other communication applications other than communicating said plurality of said stored electrical load control data packets and said plurality of said stored electrical load data packets to said data processing center.

42. The apparatus of claim 41, wherein said communicating means does not interrupt any of said other communication applications utilizing said existing telephone line to communicate with said data processing center in response to said coded instruction signal.

43. The apparatus of claim 42, wherein said data processing center processes said plurality of said stored electrical load control data packets and said plurality of said stored electrical load data packets received from said communicating means to determine the effectiveness of said electrical load management system.

44. The apparatus claim 43, wherein each of said first signal, said second signal, said third signal, and said fourth signal is a pulsed signal.

45. The apparatus of claim 44, wherein said first period is equal to said third period and said second period is equal to said fourth period.

46. The apparatus of claim 44, wherein said data processing center determines a "LOAD ON" time interval indicating the length of time that energy is supplied to said selected electrical load by said electrical distribution network within a selected predetermined time interval by multiplying the total pulse count of said first signal within said selected predetermined time interval.

47. The apparatus of claim 46, wherein said data processing center determines a "CONTROL OPERATION ON" time interval indicating the length of time that said selected electrical load is removed by said switching means from said electrical distribution network within a selected predetermined time interval by multiplying the total pulse count of said third signal within said selected predetermined time interval by said third period.

48. The apparatus of claim 38 further comprising a computing means for processing said plurality of said stored electrical load control data packets and said plurality of said stored electrical load data packets.

49. The apparatus of claim 48, wherein said computing means calculates a LOAD ON/LOAD OFF ratio representing the ratio of a time interval that said energy is supplied to said selected electrical load within a selected predetermined time interval to a time interval that said energy is not supplied to said selected electrical load within said selected predetermined time interval.

50. The apparatus of claim 49, wherein said computing means calculates a CONTROL ON/CONTROL OFF ratio representing the ratio of a time interval that said selected electrical load is removed from said electrical distribution network within a selected predetermined time interval to a time interval that said selected electrical load is inserted within said electrical distribution network within said selected predetermined time interval.

51. The apparatus of claim 50, wherein said communicating means transmits said LOAD ON/LOAD OFF ratio and said CONTROL ON/CONTROL OFF ratio to said data processing center for each of a plurality of said selected predetermined time intervals.

52. The apparatus of claim 51, wherein said data processing center processes said LOAD ON/LOAD OFF ratio and said CONTROL ON/CONTROL OFF ratio received from each of said communicating means to determine the effectiveness of said electrical load management system.

53. The apparatus of claim 38, wherein said communicating means comprises a wireless communications system.

54. The apparatus of claim 38, wherein said control operation detection means comprises a toroid surrounding a conductor connected to said selected electrical load.

55. In an electrical load management system, a method for controlling load reductions in an electrical distribution network, monitoring said load reductions and a selected one of said plurality of electrical loads to be controlled, comprising the steps:

generating electrical load data in response to the distribution and interruption of energy supplied by said electrical distribution network to said selected electrical load;

receiving a plurality of command signals from a command center remotely located from said selected electrical load;

controlling said selected electrical load in response to a selected one of said plurality of said command signals;

generating electrical load control data in response to controlling said selected electrical load;

recording said electrical load data and said electrical load control data during a plurality of predetermined time intervals to produce a plurality of stored electrical load data packets and a plurality of stored electrical load control data packets; and communicating said plurality of said stored electrical load data packets and said plurality of said stored electrical load control data packets to a data processing center, said data processing center operative to process said electrical load data and said electrical load control data to determine the effectiveness of said electrical load management system, said data processing center remotely located and separated from said electrical loads.

56. The method of claim 55, wherein said communicating step comprises the step of transmitting said plurality of said stored electrical load control data packets and said plurality of said stored electrical load data packets in response to an instruction signal transmitted by said data processing center.

57. The method of claim 56, wherein said data processing center accumulates said plurality of said stored electrical load control data packets and said plurality of said stored electrical load data packets for a selected set of said plurality of electrical loads.

58. In an electrical load management system, a method for controlling load reductions in an electrical distribution network, monitoring said load reductions, and monitoring a selected one of a plurality of electrical loads to be controlled, comprising the steps:

sensing the distribution or interruption of energy to said selected electrical load;

generating a first signal having a first period in response to said sensing the distribution of energy to said selected electrical load;

generating a second signal having a second period in response to sensing the interruption of energy to said selected electrical load;

receiving a plurality of coded command signals from a command center remotely located from said selected electrical load;

removing said selected electrical load in response to one of said plurality of said coded command signals or inserting said selected electrical load in response to another one of said plurality of said coded command signals;

detecting the removal of said selected electrical load from said network or the insertion of said electrical load into said network;

generating a third signal having a third period in response to detecting the removal of said selected electrical load from said network;

generating a fourth signal having a fourth period in response to detecting the insertion of said selected electrical load from said network;

recording said first signal and said second signal during each of a plurality of predetermined time intervals to produce a plurality of stored electrical load data packets and recording said third signal and said fourth signal during each of said plurality of predetermined time intervals to produce a plurality of stored electrical load control data packets; and communicating said plurality of said stored electrical load data packets and said plurality of said stored electrical load control data packets to a data processing center remotely located from said selected electrical load.

59. The method of claim 58, wherein said receiving step comprises the step of decoding said coded command signals.

60. The method of claim 59, wherein said communicating step comprises the step of transmitting said plurality of said stored electrical load control data packets and said plurality of said stored electrical load data packets in response to an instruction signal transmitted by said data processing center.

61. The method of claim 60, wherein said data processing center accumulates said plurality of said stored electrical load control data packets and said plurality of said stored electrical load data packets for a selected set of said plurality of electrical loads.

62. The method of claim 61, wherein said data processing center processes said plurality of said stored electrical load control data packets and said plurality of said stored electrical load data packets for said selected set of said plurality of electrical loads to determine the effectiveness of said electrical load management system.

63. In an electrical load management system, said system including means for transmitting coded command signals for causing electrical load reductions from an electrical distribution network and an improved load control switching and monitoring apparatus located proximate to each of a plurality of electrical loads to be controlled, said improved apparatus comprising:

a load management receiver for decoding said coded command signals to produce decoded command signals; and switching means for removing a selected one of said electrical loads from said electrical distribution network in response to a selected one of said decoded command signals and inserting said selected electrical load within said electrical distribution network in response to another one of said decoded command signals;

first monitoring means for producing electrical load data in response to detecting the distribution or interruption of energy to said selected electrical load, said first monitoring means comprising:

current detection means for generating a current distribution signal in response to sensing the distribution of current to said selected electrical load and a current interruption signal in response to sensing the interruption of current to said selected electrical load, and first signal generating means for generating a first signal having a first period in response to said current distribution signal and a second signal having a second period in response to said current interruption signal;

second monitoring means for producing electrical load control data in response to detecting the operation of said control means to remove said selected electrical load from said electrical distribution network and to insert said selected electrical load from said electrical distribution network, said second monitoring means comprising:

control operation detection means for generating a load removal signal in response to said switching means operating to remove said selected electrical load from said electrical distribution network and a load insertion signal in response to said switching means operating to insert said selected electrical load in said electrical distribution network; and second signal generating means for generating a third signal having a third period in response to said load removal signal and a fourth signal having a fourth period in response to said load insertion signal, recording means for recording said electrical load control data and said electrical load data during a plurality of predetermined time intervals to produce a plurality of stored electrical load control data packets and a plurality of stored electrical load data packets; and communicating means for communicating said plurality of stored electrical load control data packets and said plurality of said stored electrical load data packets to a data processing center remotely located from said selected electrical load.

64. The apparatus of claim 63, wherein said recording means comprises a first storage means and a second storage means, said first storage means for storing said first signal and said second signal during each of said plurality of said predetermined time intervals to produce said plurality of said stored electrical load data packets and said second storage means for storing said third signal and said fourth signal during each of said plurality of said predetermined time intervals to produce said plurality of said stored electrical load control packets.

65. The apparatus of claim 64, wherein each of said plurality of said stored electrical load control data packets and each of said plurality of said electrical load data packets includes timing data indicating the relative time for the start of each of said predetermined time intervals.

* * * * *